United States Patent [19]

Yoshida

[11] 4,208,830

[45] Jun. 24, 1980

[54] MECHANICAL HAND AMUSEMENT DEVICE

[75] Inventor: Kanji Yoshida, Tokyo, Japan

[73] Assignee: Tomy Kogyo Co., Inc., Japan

[21] Appl. No.: 959,225

[22] Filed: Nov. 9, 1978

[51] Int. Cl.³ .................... A63H 13/00; A61F 1/06
[52] U.S. Cl. ........................... 46/1 R; 3/12.7;
   46/119; 294/19 A
[58] Field of Search .............. 46/1 R, 116, 119, 120;
   3/12, 12.6, 12.7; 414/1, 2; 294/19 A

[56] References Cited

U.S. PATENT DOCUMENTS

| | | | |
|---|---|---|---|
| 984,179 | 2/1911 | Aydt | 3/12.7 |
| 1,247,710 | 11/1917 | Nicola | 3/12.6 |
| 1,303,905 | 5/1919 | Jensen | 3/12.7 |
| 1,377,956 | 5/1921 | Anderson | 3/12.6 |
| 1,587,780 | 6/1926 | Laherty | 3/12.6 |
| 2,429,001 | 10/1947 | Stone | 3/12.7 |
| 2,500,614 | 3/1950 | Lohmann | 3/12.7 |
| 2,545,452 | 3/1951 | Fletcher | 3/12.7 |
| 2,556,524 | 6/1951 | Drennon | 3/12.7 |
| 3,031,683 | 5/1962 | Hellwig | 294/19 A |
| 3,413,658 | 12/1968 | Becker | 3/12.7 |
| 3,731,427 | 5/1973 | Lewis et al. | 46/120 |

FOREIGN PATENT DOCUMENTS 1457651  9/1965  France .................... 294/19 A

*Primary Examiner*—Paul J. Hirsch
*Attorney, Agent, or Firm*—Staas & Halsey

[57] ABSTRACT

A mechanical hand amusement device consisting of a movable grip member joined by a rod, which extends through a tubular arm, to a hand member having a fixed thumb and four finger members which bend inward when the grip member is squeezed. Each finger member includes three hollow segments which are joined by flexible hinges at the tops, and have a flexible strap which is anchored within the fingertip segment running along the bottoms. The strap extending through each of the finger members is coupled to the rod so that a portion of the strap is retracted into the hand member when the grip member is squeezed. The resulting forces move the finger members inward in a grasping motion. A spring within the hand member returns the elements to their at-rest positions when the grip member is released.

1 Claim, 6 Drawing Figures

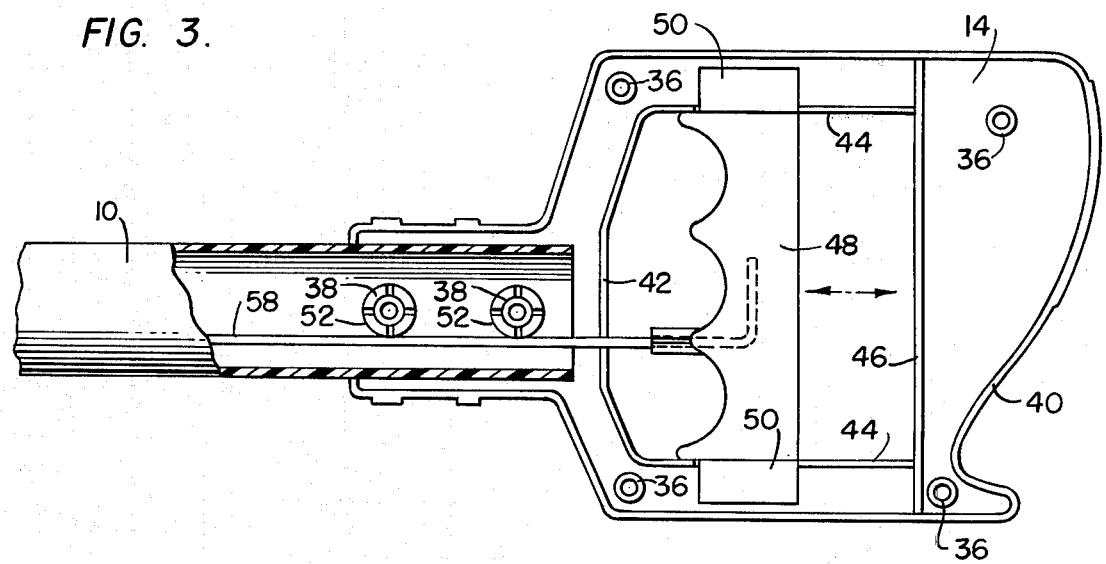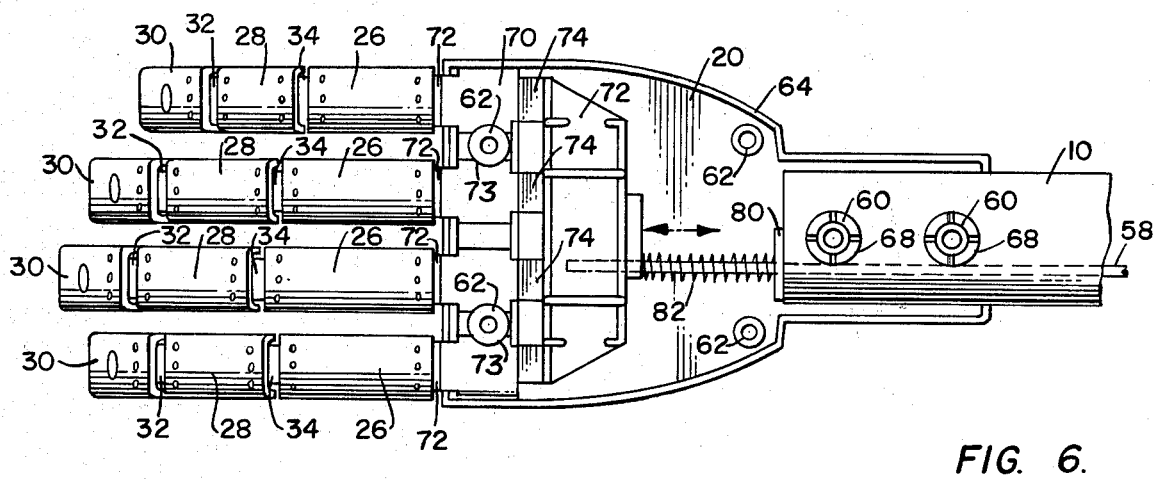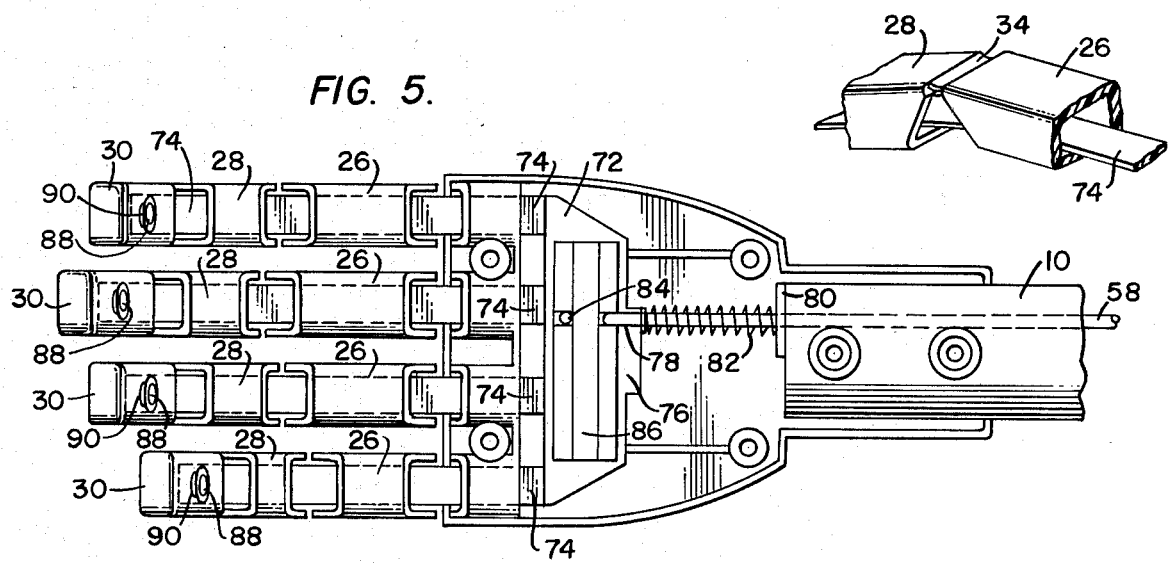

MECHANICAL HAND AMUSEMENT DEVICE

BACKGROUND AND SUMMARY OF THE INVENTION

The present invention relates to an amusement device, and in particular, to a mechanical hand amusement device having a fixed thumb and movable fingers which curl inward when a grip member is squeezed. Upon release of the grip, which is positioned at the end of the tubular arm, a spring within the hand member restores the grip member to its normal position and allows the fingers to uncurl. Small resilient fingertip members are provided at the ends of the finger tips to increase gripping power.

The body of each of the finger members is formed by a single plastic element having three hollow segments joined at the top by flexible hinges. The segments are not joined at the bottoms, which are smaller than the tops so as to allow bending motion. A flexible strap is tethered at the fingertip segment of each finger and extends through and along the bottom of the remaining segments into the hand member, where it is coupled to the rod. Squeezing the grip member causes the straps to be retracted into the hand member, thereby curling the finger members inward towards the palm.

BRIEF DESCRIPTION OF THE DRAWINGS

FIG. 3 is a top plan view of the handle with the top portion removed, illustrating the movement of the grip and reciprocation of the rod extending through the tubular arm;

FIG. 4 is a top view of the hand member with the top portion removed, illustrating the connection of the rod to the displaceable member to which the straps are secured;

FIG. 5 is a bottom plan view of the hand member with the palm member removed; and FIG. 6 is a perspective view of a portion of a finger member showing two hollow segments joined by a hinge at the top and having a flexible strap positioned along the bottom thereof.

DESCRIPTION OF THE PREFERRED EMBODIMENT

Figure 1:
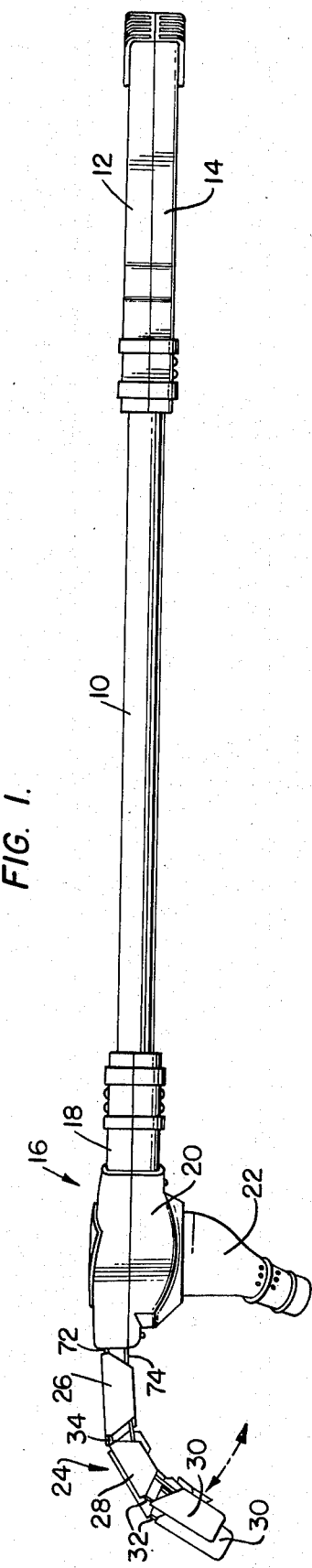
FIG. 1 is a side view of the mechanical hand amusement device of the present invention, illustrating generally the grasping motion of the movable finger members.

The mechanical hand amusement device of the present invention is generally illustrated in FIG. 1, and includes tubular arm 10 having top handle 12 and lower handle 14 at one end thereof, and hand member 16 at the other end. Hand member 16 includes top hand member 18, palm member 20, and digits such as fixed thumb member 22 and four movable finger members 24. Each movable finger member 24 includes a first segment 26, a second segment 28, and a third segment 30, segments 28 and 30 being joined by flexible hinge 32, and segments 26 and 28 being joined by flexible hinge 34.

Turning now to FIG. 3, lower handle 14 is provided with small threaded cylinders 36, large threaded cylinders 38, and flanges 42, 44 and 46. Flanges 44 are of lesser height than flanges 40, 42 and 46, so as to accommodate projections 50 of grip member 48 and thereby allow grip 48 to undergo reciprocating movement when it is squeezed and released. Threaded cylinders 38 project through mounting holes 52 in tubular arm 10 so as to securely mount arm 10. As is seen FIG. 2, top handle 12 is provided with holes 54 through which screws 56 extend so as to join top handle 12 and lower handle 14. Metal rod 58 is embedded in grip 48 and extends through tubular arm 10 to hand member 16.

Turning now to FIG. 4, palm member 20 is provided with threaded cylinders 60 and 62, along with flange 64 which has four slots 66 (not shown) through which finger members 24 extend. Threaded cylinders 60 extend through holes 68 in tubular arm 10 so as to securely mount hand member 16 to tubular arm 10. Element 70, which is joined to the segments 26 by flexible hinges 72, is provided with holes 73 through which threaded cylinders 62 extend so as to firmly mount element 70 within the hand member 16. Element 70 is also provided with four openings 71 (not shown), whose purpose will be described later, corresponding to the fingers 24.

Turning now to FIG. 5, displaceable member 72 is provided with four flexible straps 74, and flange 76 having notch 78. Rod 58 extends through washer 80, spring 82, and notch 78 into the interior region of displaceable member 72. There hook 84 at the end of rod 58 engages metal strip 86, which is fixably secured to displaceable member 72. It will be apparent that when grip member 48 is squeezed, rod 58 will transmit motion through tubular arm 10 and cause displaceable member 72 to be retracted towards tubular arm 10. Moreover, when grip member 48 is released, the tension of spring 82 will restore displaceable member 72 and grip member 48 to their former positions.

With continuing reference to FIG. 5, each of the straps 74 extends through an opening 71 in element 70, segment 26, segment 28, and is fixably attached to the inside of the terminal segment 30 by a rivet 88. In addition to securing strap 74, the rivets 88 also mount rubber fingertip members 90 outside the segments 30 to increase gripping power.

Figure 2:
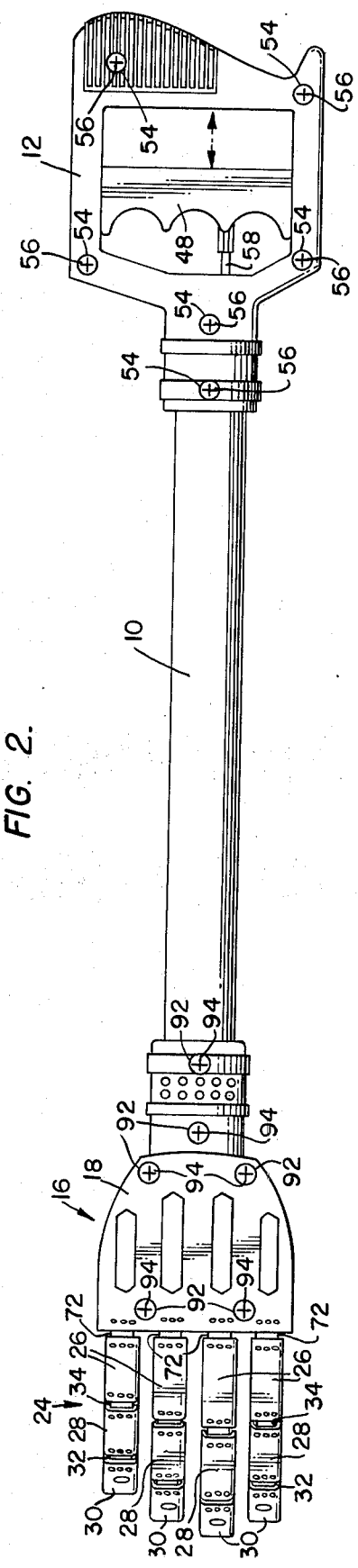
FIG. 2 is a top plan view of the amusement device showing generally the motion of the grip which controls the flexing and unflexing of the finger members.

Turning now to FIG. 2, top hand member 18 is provided with holes 92 through which screws 94 extend to secure top hand member 18 and palm member 20, with element 70 and displaceable member 72 encased between them.

With reference to FIGS. 4, 5, and 6, the operation of the invention can now be explained. It is apparent that the total distance between element 70 and the end of each outstretched finger members 24 is equal to the length of segments 26, 28 and 30, in addition to the smaller lengths of hinges 32, 34 and 72. When grip member 48 is squeezed, however, the effective length of the straps 74 extending along the bottoms of the finger members 24 is decreased. It will be noted that spacers can be provided upon the strap 74, and hidden from sight within segments 28 and 30, so as to loosely hold the straps 74 at the bottoms of the finger members 24. It is apparent that squeezing grip member 48 decreases the length at the bottom of each finger member 24 with respect to the top of the same member. Under the influence of the forces thus created hinges 32, 34 and 72 flex in simulation of the movement of the human hand. The fingers move inward in a grasping motion and can clasp objects against fixed thumb member 22. When grip member 48 is released spring 82, which has been squeezed between washer 80 and flange 76, expands and restores grip member 48 and displaceable member 72 to their at-rest positions. The force of spring 82, in addition to the natural resilience of the hinges 32, 34, and 72, cause the finger members 24 to extend outward to an open-hand position.

What is claimed is:

1. An amusement device, comprising:
   a tubular arm having first and second ends;
   a grip member movably mounted at the first end of said arm;
   a hand member mounted at the second end of said arm, said hand member having a fixed thumb member and four movable finger members, each finger member having three hollow segments joined by flexible hinges;
   an element fixedly mounted within said hand member, each of said finger members being attached to said element by a flexible hinge, said element having four openings therein corresponding to said four finger members; and
   means connecting said grip member and said four finger members for curling said four finger members when said grip member is squeezed and restoring said four finger members to their former positions when said grip member is no longer squeezed, said means including a rod having a first end connected to said grip member and a second end terminated in a hook, said rod extending through said tubular arm into said hand member, a displaceable member movably mounted within said hand member, a metal strip fixedly mounted to said displaceable member and secured to said hook, four flexible straps corresponding to said four finger members, each of said straps having a first end attached to said displaceable member and a second end attached to the terminal segment of said corresponding finger member, each of said straps extending through the remaining segments of said corresponding finger member and through the corresponding opening in said element, spring means for biasing said displaceable member away from the second end of said tubular arm.

* * * * *